United States Patent
Gupta

(10) Patent No.: US 10,082,772 B2
(45) Date of Patent: Sep. 25, 2018

(54) METHOD AND A SYSTEM FOR TUNING MULTIVARIABLE PID CONTROLLER

(71) Applicant: ABB RESEARCH LTD, Zürich (CH)

(72) Inventor: Arun Gupta, Mumbai (IN)

(73) Assignee: ABB RESEARCH LTD, Zurich (CH)

( * ) Notice: Subject to any disclaimer, the term of this patent is extended or adjusted under 35 U.S.C. 154(b) by 995 days.

(21) Appl. No.: 14/261,109

(22) Filed: Apr. 24, 2014

(65) Prior Publication Data
US 2014/0236316 A1   Aug. 21, 2014

Related U.S. Application Data

(63) Continuation of application No. PCT/IB2012/002064, filed on Oct. 15, 2012.

(30) Foreign Application Priority Data

Oct. 24, 2011   (IN) .......................... 3637/CHE/2011

(51) Int. Cl.
G05B 13/04   (2006.01)

(52) U.S. Cl.
CPC ........... *G05B 13/04* (2013.01); *G05B 13/048* (2013.01)

(58) Field of Classification Search
None
See application file for complete search history.

(56) References Cited

U.S. PATENT DOCUMENTS

| | | |
|---|---|---|
| 2005/0107895 A1 | 5/2005 | Pistikopoulos et al. |
| 2008/0071395 A1 | 3/2008 | Pachner |
| 2009/0198350 A1 | 8/2009 | Thiele |
| 2011/0071653 A1 | 3/2011 | Kihas |
| 2012/0221124 A1 | 8/2012 | Thiele |
| 2014/0094938 A1 | 4/2014 | Kihas |

FOREIGN PATENT DOCUMENTS

EP   2 302 469 A2   3/2011

OTHER PUBLICATIONS

International Search Report (PCT/ISA/210) dated Mar. 22, 2013, by the European Patent Office as the International Searching Authority for International Application No. PCT/IB2012/002064.

*Primary Examiner* — Mohammad Ali
*Assistant Examiner* — Saad M Kabir
(74) *Attorney, Agent, or Firm* — Barnes & Thornburg LLP

(57) ABSTRACT

A method and system are disclosed for tuning a Multivariable Proportional-Integral-Derivative (PID) controller in a process plant. The plant can have at least one PID controller for controlling the processes of the plant. The method can include formulating Model Predictive Control (MPC) for the process model of the plant; obtaining a desired (e.g., optimal control) solution for at least one designated (e.g., critical) region in relation to the MPC; determining PID tuning parameters corresponding to the control solution; and tuning the PID controller with the PID tuning parameters.

10 Claims, 1 Drawing Sheet

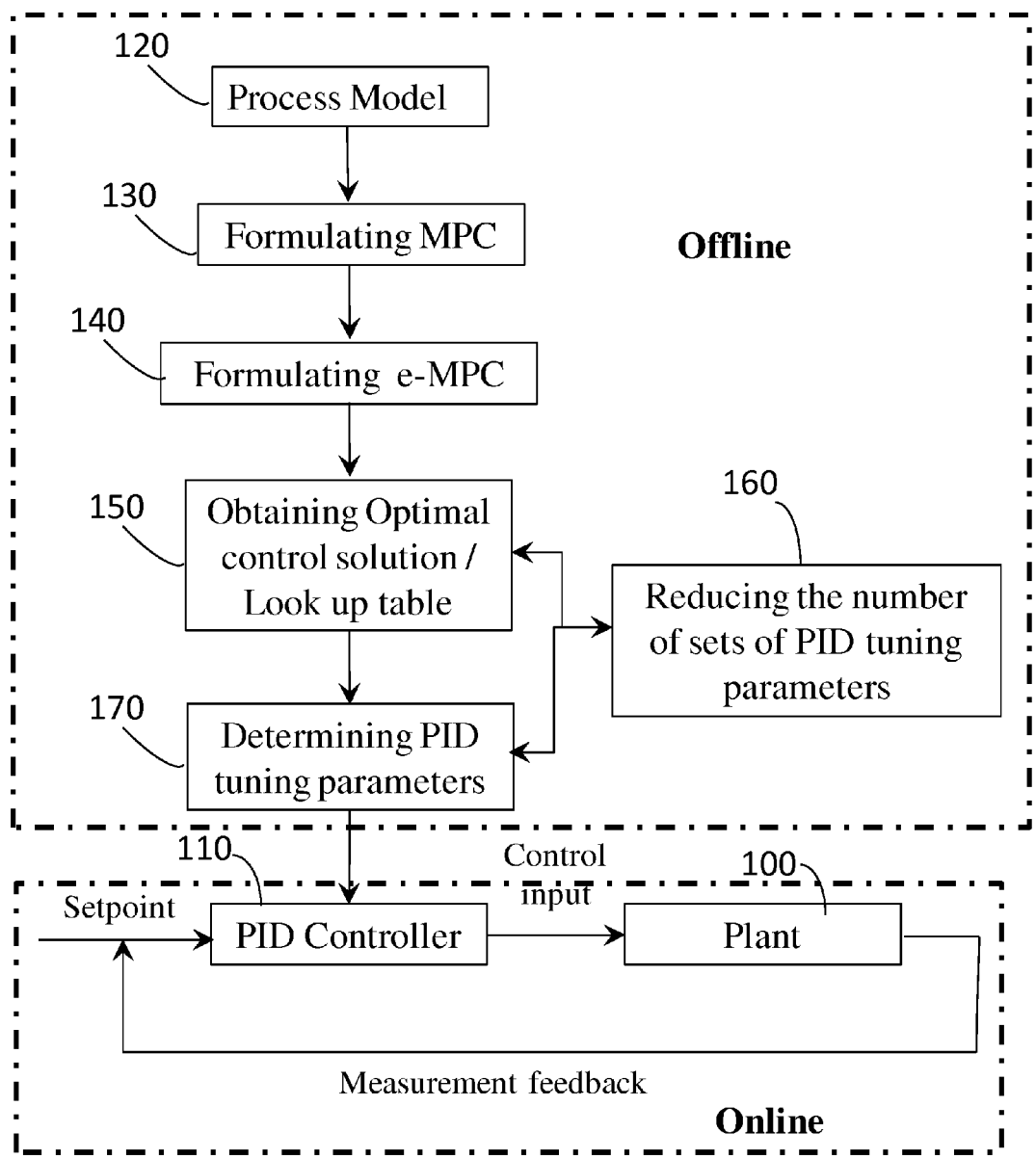

METHOD AND A SYSTEM FOR TUNING MULTIVARIABLE PID CONTROLLER

RELATED APPLICATION

This application claims priority as a continuation application under 35 U.S.C. § 120 to PCT/IB2012/002064, which was filed as an International Application on Oct. 15, 2012 designating the U.S., and which claims priority to Indian Application 3637/CHE/2011 filed in India on Oct. 24, 2012. The entire contents of these applications are hereby incorporated by reference in their entireties.

FIELD

The present disclosure relates to controllers in an industrial control system, and for example to tuning of a multivariable PID (Proportional Integral Derivative) Controller.

BACKGROUND

A PID controller is a controller relating to a control loop having a feedback mechanism, and is a commonly used feedback controller in an industrial control system. PID controllers are employed in control loops to minimize error due to the difference between a measured process variable and a desired setpoint by adjusting the process control inputs.

PID control involves constant parameters corresponding to proportional (P), integral (I) and derivative (D) values that are interpreted in terms of time, in which P depends on the present error, I on the accumulation of past errors, and D being a prediction of future errors. The weighted sum of these three parameters P, I and D is utilized in adjusting the process through a control element, such as position of a control valve etc.

In practice, the controllers are tuned through adjustment of the control parameters in order to achieve a desired control response. Accordingly, PID controllers also involve tuning which is not trivial, even though there are only three control parameters involved; the tuning of the PID controller should satisfy complex criteria within the limitations of PID control such that it is a feedback system, the overall performance is reactive, etc.

The tuning of PID control based on heuristic rules, or any other rules or the like known until now, focuses on single loop performance and does not address process interactions. However, it can become important to consider and address process interactions to achieve better control of the processes.

A system is said to be multivariable if it has more than one variable to be controlled or more than one variable which can be manipulated. Multivariable PID caters to the above noted process interactions, and corresponds to multiple single loop PIDs with tuning that addresses the process interactions. Thus, Multivariable PID can be better as compared to single loop performance because it captures process information into the tuning rules. However, Supervisory control such as Model Predictive Control (MPC), Fuzzy control, etc can ensure better controller performance. MPC for example, accounts for constraints on the system while minimizing the output error in a predictive manner, accounting for the predictive capability of a process model into tuning rules.

Currently, PID controllers continue to be predominantly used controllers in process industries because of more practically known reasons such as legacy, reliability, simplicity etc. Hence the present disclosure addresses the tuning of the PID controllers for multivariable processes in an optimal manner, including the advantages of MPC, and provides solutions for such tuning of PID.

SUMMARY

A method is disclosed for tuning an adaptive Multivariable Proportional-Integral-Derivative (PID) controller in a plant using a Model Predictive Control (MPC), the method comprising: formulating the MPC for a process model of the plant; obtaining an affine control solution for at least one designated region, in relation to the MPC; obtaining a transfer function for mapping the affine control solution to one or more equivalent PID tuning parameters; determining the one or more equivalent PID tuning parameters corresponding to the affine control solution using the obtained transfer function; and tuning the adaptive Multivariable PID controller with the one or more equivalent PID tuning parameters to control the plant in the at least one designated region.

A system is also disclosed for tuning an adaptive Multivariable Multivariable Proportional-Integral-Derivative (PID) controller, the system comprising: at least one PID controller for controlling processes of a plant; a process model for the a plant to be controlled; a Model Predictive Control (MPC) module for formulating MPC for the process model; an optimizing module for obtaining a desired an affine control solution and a transfer function, and for determining one or more equivalent PID tuning parameters thereof; and a tuning module for tuning the adaptive Multivariable at least one PID controller with the equivalent one or more PID tuning parameters.

BRIEF DESCRIPTION OF THE DRAWING

Features and advantages disclosed herein will become apparent when the following detailed description is read with reference to the accompanying drawing in which:

FIG. 1 shows an exemplary method for tuning Multivariable PID controller in accordance with an exemplary system as presently disclosed.

DETAILED DESCRIPTION

A method is disclosed for tuning multivariable PID control that includes MPC.

A method is also disclosed for tuning multivariable PID control that can offer PID tuning parameter values corresponding to a desired (e.g., an optimal) control solution.

An exemplary method for tuning multivariable PID control can be achieved with manageable sets of PID parameters.

Exemplary systems are also disclosed for tuning multivariable PID.

An exemplary method is disclosed for tuning a Multivariable Proportional-Integral-Derivative (PID) controller in a process plant. The plant has at least one PID controller for controlling the processes of the plant. The method can include formulating Model Predictive Control (MPC) for the process model of the plant; obtaining a desired (e.g., an optimal) control solution for at least one critical range in relation to the MPC; determining equivalent PID tuning parameters (i.e., corresponding to the optimal control solution) and tuning the PID controller with the PID tuning parameters.

An exemplary system is also disclosed for tuning a Multivariable Proportional-Integral-Derivative (PID) controller in accordance with the method. The system can include at least one PID controller for controlling the processes of a plant; a process model for the plant; a MPC module for formulating MPC for the process model; an optimizing module for obtaining an optimal control solution and the PID tuning parameters thereof; and a tuning module for tuning the at least one PID controller with the PID tuning parameters.

An exemplary embodiment will now be described further herein with reference to the non-exhaustive embodiment illustrated in FIG. 1.

In FIG. 1, a plant (100) has at least one PID controller (110) for controlling the processes of the plant (100). The PID controller can correspond or relate to any known controller type (e.g., Proportional, Proportional-Integral, Proportional-Derivative or Proportional-Integral-Derivative), but be configured to implement the operational features disclosed herein. The plant (100) and the control processes related thereto are represented by a process model (120).

A Model Predictive Control (MPC) module is provided for formulating MPC for the process model (120). The formulation of the MPC (130) can be performed offline. Explicit-MPC (e-MPC) algorithms can be utilized (140) for obtaining the offline solution of MPC. The offline solution of MPC accounts for the constraints on the plant or the system. Also, it can have the capability to minimize the error in a predictive manner. The solution of MPC therefore captures the predictive capability of the process model.

The solution of MPC provides optimal control solution (150) that caters to a affine function of states in an identified, designated (e.g., critical) region, and can be captured in a look up table. The content of the look up table, essentially each of the desired (e.g., optimal) control solutions can represent a static state feedback control law. From thereon, the PID tuning parameters can be determined corresponding to the desired (e.g., a predetermined optimal) control solution by the optimizing module. This may involve reducing the number of sets of PID tuning parameters (160).

Reducing the number of sets of PID tuning parameters (160) can be achieved by, for example, a) merging or grouping certain designated (e.g., critical) regions and then determining the PID tuning parameters corresponding to the merged or grouped critical regions; or by b) merging or grouping some of the PID tuning parameters that have been determined to correspond to different designated (e.g., critical) regions and then grouping or clustering such different critical regions together. However, the grouping of regions can result in relaxing the constraints on manipulated and/or control variables.

The PID tuning parameters and their corresponding operating range constitute an adaptive gain PID controller. The PID controller (110) can correlate with such an adaptive gain PID controller or adaptive PID controller. Operating range is the range of values acceptable for all states, control variables and manipulated variables. An exemplary critical region is a subset of an operating range for which an optimal control solution is valid in one critical region. Summation of all critical regions can result in operating range.

The PID controller (110) can be tuned (170) by the tuning module or the like, in relation to the PID tuning parameters, and with regard to an adaptive PID controller. The tuned PID controller, which is a Multivariable PID controller purporting to multiple single loop PIDs with at least one control variable and corresponding manipulated variable, can be implemented online in a closed loop in the plant. Since an optimal control solution can be obtained considering the constraints on the plant and of the system thereof, the PID tuning parameters so determined also inherit the constraints that have been considered. Therefore, the PID tuning parameters implicitly account for the constraints on the plant.

To understand features of the disclosed invention better, a non-exhaustive exemplary case will be presented herein.

A discrete dynamical state-space model representing the plant and the system thereof can be considered as follows:

$$x_{k+1} = f(x_k, u_k)$$

$$y_k = g(x_k, u_k)$$

which has the following constraints:

$$y_{min} \leq y_k \leq y_{max}, \forall k > 0$$

$$u_{min} \leq u_k \leq u_{max}, \forall k \geq 0$$

$$\Delta u_{min} \leq \Delta u_k \leq \Delta u_{max}, \forall k \geq 0$$

where, $y \in \mathbb{R}^p$ is the vector of outputs, $u \in \mathbb{R}^m$ is the vector of inputs, $x \in \mathbb{R}^n$ is the vector of states and $\mathbb{R}^m \ni \Delta u_k = u_k - u_{k-1}$ and f and g are functions of states x and inputs u. This general system, when linearized can also be represented in state space form as follows:

$$x_{k+1} = Ax_k + Bu_k$$

$$y_k = Cx_k + Du_k$$

MPC for both linear and non-linear system models are well established and is:

$$\Omega = \min_{U \triangleq \{\Delta u_k, \ldots, \Delta u_{k+N_u-1}\}} \left\{ \sum_{j=1}^{N_y} (\hat{y}_{k+j} - y_{r_{k+j}})^T W_y (\hat{y}_{k+j} - y_{r_{k+j}}) + \sum_{j=0}^{N_u-1} \Delta u_{k+j}^T W_{\Delta u} \Delta u_{k+j} + \sum_{j=0}^{N_u-1} u_{k+j}^T W_u u_{k+j} \right\}$$

where, $\hat{y}$ represents the estimated value of output from model and y represents the actual plant output. $N_y$ and $N_u$ represents prediction and control horizons respectively.

The e-MPC formulation on an MPC problem is as follows:

$$\Omega = \min_{U \triangleq \{\Delta u_k, \ldots, \Delta u_{k+N_u-1}\}} \left\{ \frac{1}{2} U^T H U + \begin{bmatrix} x_k \\ u_{k-1} \\ e \end{bmatrix} F U \right\}$$

$$\text{such that } GU \leq W + E \begin{bmatrix} x_k \\ u_{k-1} \\ e \end{bmatrix}$$

where, $e = y_r - y$ and H, F, G, W, E are constant matrices of appropriate dimensions.

For e-MPC implementation the vector $$\begin{bmatrix} x_k \\ u_{k-1} \\ e \end{bmatrix}$$

is represented as a vector $\theta$.

Please note that the input $u_{k-1}$ appears only when constraints on rate of change of input are present.

The solution of the e-MPC can be obtained in the form of look up table shown as follows in Table 1:

TABLE 1

Look up table showing solution of e-MPC

| Operating range (critical regions) | Affine control law |
|---|---|
| $\theta_0 \le \theta \le \theta_1$ | $U = M_1\theta_k + m_1$ |
| $\theta_1 \le \theta \le \theta_2$ | $U = M_2\theta_k + m_2$ |
| $\vdots$ | $\vdots$ |
| $\theta_{n-1} \le \theta \le \theta_n$ | $U = M_n\theta_k + m_n$ | where, $M_1, M_2, \ldots M_n$ and $m_1, m_2, \ldots m_n$ are constant matrices of appropriate dimensions.

Each row of above table 1 represents a static state feedback control law, which can also be written as:

$$T(s) \triangleq x(s) = (sI-A)^{-1}B.u(s)$$

which are rational, strictly proper n×m matrices.

An equivalent set of PID tuning parameter that can be obtained as follows:
A static state feedback controller is defined by:

$$u(s) = Fx(s) + Gv(s)$$

where v is the external input. For e-MPC, this can be thought of as the error, $e = y_r - y$ or $$\begin{bmatrix} u_{k-1} \\ e \end{bmatrix}.$$

An equivalent transfer function of static state feedback controller can be found as:

$$u(s) = K(s)v(s)$$

where, $$K(s) = [I - FT(s)]^{-1}G.$$

For the case, where v contains e only; K(s) presents a control law between the output error and the input, which is the case with PID controller.

$$u(s) = \left(K_P + \frac{1}{sT_I} + T_D s\right)e(s)$$

Then, the two control laws (e.g., an affine control law and PID control law) can be equated and PID tuning parameters can be calculated using a polynomial form of transfer functions. In the case a degree of polynomial in K(s) is larger than that of a PID polynomial, the PID polynomial can be approximated to the K(s) polynomial.

For the case, where v contains $$\begin{bmatrix} u_{k-1} \\ e \end{bmatrix};$$

K(s) presents a control law between the output error and the change in input, which is the case with a velocity PID controller.

Please note this is one of the many ways by which equivalent or approximate PID control law or of the PID tuning parameters can be determined. As such, this should not be considered to restrict the invention to this particular method or its extensions.

The equivalent PID tuning parameter values in respect of the optimal control solution of affine control law is shown in below table 2.

TABLE 2

Equivalent PID tuning parameter values for desired (optimal) control solution of affine control law

| Operating range (critical regions) | Affine control law | PID tuning parameter values |
|---|---|---|
| $\theta_0 \le \theta \le \theta_1$ | $U = M_1\theta_k + m_1$ | $P = P_1; I = I_1; D = D_1$ |
| $\theta_0 \le \theta \le \theta_1$ | $U = M_2\theta_k + m_2$ | $P = P_2; I = I_2; D = D_3$ |
| $\vdots$ | $\vdots$ | $\vdots$ |
| $\theta_{n-1} \le \theta \le \theta_n$ | $U = M_n\theta_k + m_n$ | $P = P_n; I = I_n; D = D_n$ | where, P, I and D are proportional, integral and derivative gains of a standard PID controller. In this case, these will be matrices of dimension equal to number of outputs (controlled variables).

Further there may be a reduction in the size of number of sets of PID tuning parameters. This can be achieved either by 1) merging certain critical regions and then calculating the PID tuning parameters corresponding to merged critical regions; or by 2) merging some of the PID tuning parameters corresponding to different critical regions and then clustering those regions together.

The following table 3 shows the reduced set with $n \ge 1$.

TABLE 3

Reduced set of PID tuning parameters

| Operating range (critical regions) | PID tuning parameter values |
|---|---|
| $\theta_0 \le \theta \le \theta_1$ | $P = P_1; I = I_1; D = D_1$ |
| $\theta_1 \le \theta \le \theta_2$ | $P = P_2; I = I_2; D = D_3$ |
| $\vdots$ | $\vdots$ |
| $\theta_{l-1} \le \theta \le \theta_l$ | $P = P_l; I = I_l; D = D_l$ |

The PID tuning parameters values and their corresponding operating range constitute an adaptive gain PID controller.

This adaptive gain PID controller can be implemented online in closed-loop with plant.

Only certain exemplary features of the invention have been specifically illustrated and described herein, and many modifications and changes will occur to those skilled in the art. The invention is not restricted by the exemplary embodiments described herein. It is to be noted that the invention is explained by way of exemplary embodiment and is neither exhaustive nor limiting. Certain aspects of the invention that have not been elaborated herein will be apparent to one skilled in the art.

Also, the terms relating to singular form used herein in the description also include its plurality and vice versa, wherever applicable. Any relevant modification or variation, which is not described specifically in the specification, is in fact to be construed as being well within the scope of the invention. The appended claims are intended to cover all such modifications and changes which fall within the spirit of the invention.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

I claim:

1. A method for tuning an adaptive Multivariable Proportional-Integral-Derivative (PID) controller within an operating range of the Multivariable PID controller, in a plant using a Model Predictive Control (MPC), the operating range comprising a plurality of critical regions, the method comprising:

formulating the MPC for a process model of the plant, wherein a solution of the MPC accounts for constraints on the plant;

obtaining an optimal control solution of the MPC in one or more critical regions from the plurality of critical regions using a look-up table comprising a plurality of rows, wherein each row of the look-up table is associated with a critical region from the plurality of critical regions, wherein each critical region from the plurality of critical regions is associated with a corresponding affine control law in the look-up table, the corresponding affine control law having the form U=M·θ+m, where U is an output, θ is an input, and M and m are constant matrices, and wherein the optimal control solution accounts for the constraints on the plant and the optimal control solution is for providing the affine control law corresponding to each of the one or more critical regions;

determining one or more equivalent PID tuning parameters for the one or more critical regions corresponding to the optimal control solution of the MPC in the one or more critical regions based on the one or more corresponding affine control laws from the plurality of affine control laws, wherein determining the one or more equivalent PID tuning parameters comprises one of (i) merging the one or more critical regions and (ii) clustering the one or more critical regions by merging the one or more equivalent PID tuning parameters corresponding to the one or more critical regions; and tuning the adaptive Multivariable PID controller with the one or more equivalent PID tuning parameters to control the plant in the one or more critical regions.

2. The method as claimed in claim 1, comprising:
formulating the MPC and obtaining the optimal control solution offline.

3. The method as claimed in claim 1, comprising:
obtaining the optimal control solution for the one or more critical regions purports to an affine function of one or more of states, inputs, or error in a critical region of operation.

4. The method as claimed in claim 1, wherein determining the one or more equivalent PID tuning parameters comprises:
reducing the number of sets of PID parameters.

5. The method as claimed in claim 4, wherein reducing the number of sets of PID tuning parameters comprises:
merging a plurality of critical regions of operation, and determining PID tuning parameters corresponding to the plurality of critical regions of operations thereof.

6. The method as claimed in claim 4, wherein reducing the number of sets of PID tuning parameters comprises:
grouping two or more sets of PID tuning parameters corresponding to different critical regions, and merging the different critical regions.

7. The method as claimed in claim 1, wherein obtaining the optimal control solution, in relation to the MPC comprises:
accounting for one or more constraints of the plant.

8. The method as claimed in claim 1, wherein the PID tuning parameters account for the predictive capability of the MPC in relation to the process model, by which an output error is minimized in a predictive manner.

9. The method as claimed in claim 1, wherein the PID tuning parameters and their corresponding critical regions purport to the adaptive Multivariable PID controller with adaptive gain.

10. The method as claimed in claim 1, comprising:
implementing the adaptive Multivariable PID controller online in a closed loop in the plant.

* * * * *